Figure 1:
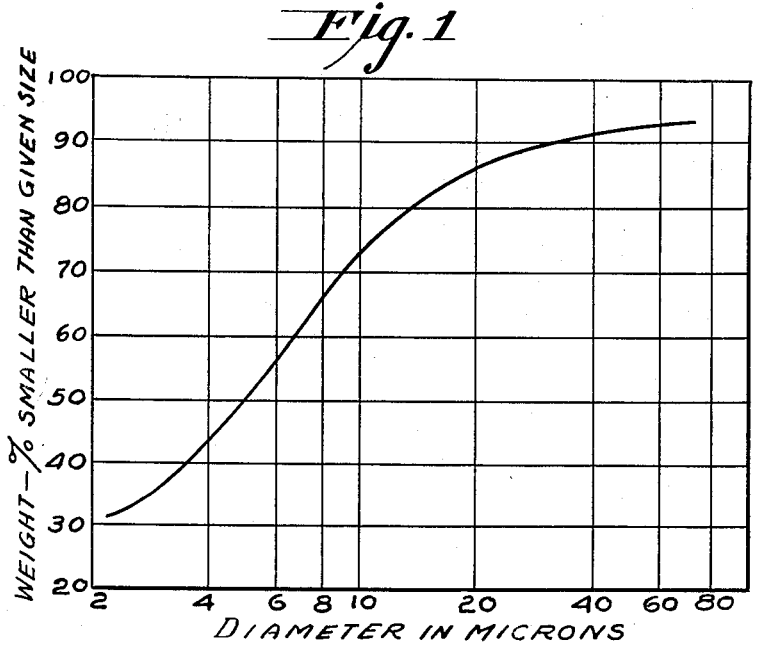
Figure 2:
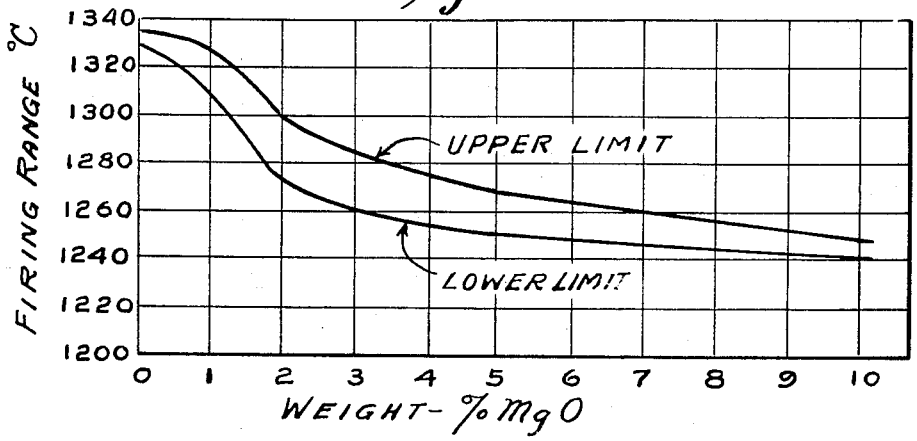
Figure 3:
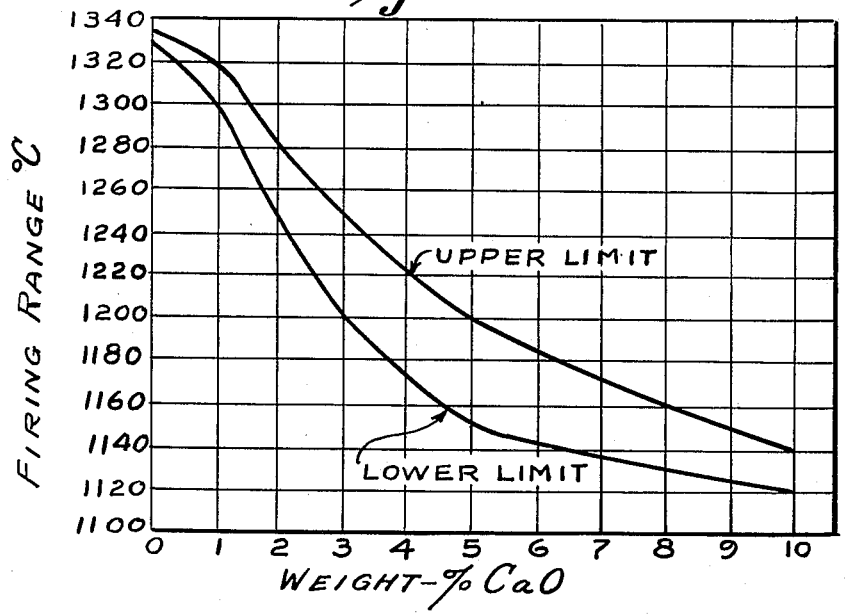
Figure 4:
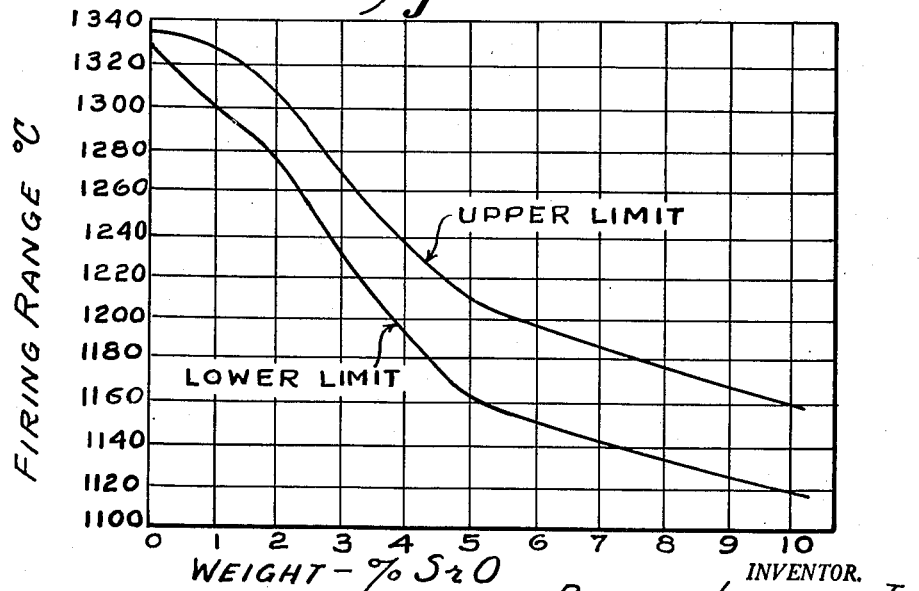
Figure 5:
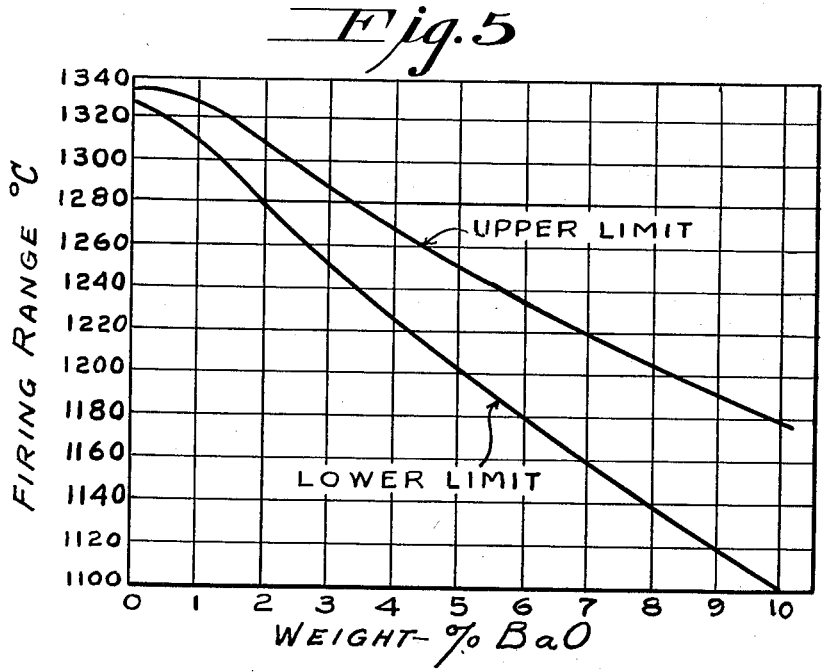

Jan. 5, 1960 R. LANDRON, JR 2,919,995
LOW EXPANSION CERAMIC BODY AND A METHOD OF MAKING IT
Filed Feb. 12, 1958 3 Sheets-Sheet 1

INVENTOR.
RAFAEL LANDRON JR.
BY
Clarence R Patty, J.
ATTORNEY

INVENTOR.
RAFAEL LANDRON JR.
BY Clarence R. Patty, Jr.
ATTORNEY

United States Patent Office 2,919,995
Patented Jan. 5, 1960

2,919,995

LOW EXPANSION CERAMIC BODY AND A METHOD OF MAKING IT

Rafael Landron, Jr., Corning, N.Y., assignor to Corning Glass Works, Corning, N.Y., a corporation of New York Application February 12, 1958, Serial No. 714,914

5 Claims. (Cl. 106—63)

This invention relates to refractory ceramic bodies having low thermal expansion coefficients and high thermal shock resistance, composed primarily of a sintered mixture of petalite and one or more compounds of the alkaline earth metals, magnesium, calcium, strontium, and barium, and a method for making such bodies.

Refractory compositions having high thermal shock resistance and low thermal expansion coefficients are used in making crucibles, cooking utensils, heat exchangers, kiln furniture, and the like. Two important properties, which are essential for compositions to be used for such purposes, are low linear coefficient of thermal expansion (hereinafter referred to as "expansion coefficient"), preferably zero, and high modulus of rupture, to prevent chipping, cracking, and spalling when subjected to rapid changes in temperature. As another important property, the refractory compositions should have a relatively long sintering range or interval between the sintering temperature and the sagging temperature, in order that green bodies made therefrom may be fired in a conventional manner to produce a body of zero porosity which will not absorb materials used in contact with the finished body. Another requirement is high thermal stability so that articles made therefrom may be used for prolonged periods of time at elevated temperatures without loss of useful properties.

Fused silica and high silica glass (over 96% $SiO_2$) have been proposed for such purposes because of their relatively low expansion coefficients ($5.5 \times 10^{-7}$ and $8.0 \times 10^{-7}$ per ° C. respectively). However, such compositions have not been entirely satisfactory for the intended purpose because they tend to devitrify after considerable exposure to temperatures of about 900–1000° C. Devitrification roughens their surfaces and raises their expansion coefficients thereby lowering their thermal shock resistance.

The use of cordierite is commonly resorted to as it is inexpensive and has a lower expansion coefficient ($25-30 \times 10^{-7}$ per ° C.) than other conventional ceramic bodies. However, its expansion coefficient is high enough to limit the thermal shock that objects made therefrom can withstand.

It has been known for some time that natural petalite, which contains lithia, alumina, and silica in the ratio of 1:1:8 respectively, has a very small, negative expansion coefficient ($-1.5 \times 10^{-7}$ per ° C.). However, attempts to manufacture sintered bodies from this material by firing in the conventional manner have met with little success because the temperature at which sintering and coalescence occurs is very close to the temperature at which complete melting results. Therefore, firing a preformed body of petalite particles in the conventional manner to sinter the particles results in a non-uniform body wherein one portion exhibits a high degree of porosity and/or another portion becomes hot enough to flow or sag, thereby distorting the shape of the article. Intentional overfiring of the body to insure adequate coalescence throughout is unsuccessful, even if supported by additional means to prevent deformation, since the body is thereby converted to a mixture of crystals of beta-spodumene having an expansion coefficient of about zero and a glass matrix having an expansion coefficient of $45 \times 10^{-7}$ per ° C. This causes crazing of the body when cooled. On the other hand, limiting the firing temperature to preclude overfiring of any portion of the article, results in a porous body with a modulus of rupture of only 1000–3000 p.s.i. which will objectionably absorb fluids used in contact therewith.

One means which has been used to obtain a non-porous body is to mix petalite with up to about 50 weight percent of clay. While this results in substantially non-porous bodies when sufficient clay is used, the high coefficient of thermal expansion of the clays used therein causes a proportionally higher expansion coefficient in the final body and this expansion coefficient changes erratically as the body is subjected in use to further heating.

One object of the present invention is to provide a method for making ceramic articles which will withstand repeated severe thermal shocks.

Another object is to provide a ceramic article of low thermal-expansion coefficient which will maintain its useful properties when used at temperatures of about 1000° C. for prolonged periods of time.

Another object is to provide a low expansion ceramic article which is non-porous.

Another object is to provide a ceramic article which is non-porous and will withstand severe thermal shock.

Another object is to provide a means for glazing a low expansion ceramic article with a non-porous surface layer.

Other objects of the invention will become apparent from consideration of the following detailed description of the invention.

In general, the objects of the present invention are achieved by preparing a ceramic batch of finely divided petalite containing one or more finely divided compounds of the alkaline earth metals in a total amount of about 1 to 10 percent by weight on the oxide basis before performing the conventional ceramic procedures of preforming the batch to the desired shape of the article by slip casting, dry pressing, or glazing a ceramic bisque, and firing the article at a temperature of about 1100–1330° C. until the mixture consolidates and coalesces to an apparent porosity of about zero.

I have found that while the compounds which are essential for the purposes of this invention are petalite and alkaline earth metal oxide, such oxide may be added to the batch as any compound which will thermally decompose at a temperature less than the firing temperature to produce the oxide without introducing extraneous materials into the composition other than silica. Where a gas is thus formed, it obviously escapes to the furnace atmosphere while the silica which is introduced goes into solid solution along with the excess silica resulting from the normal conversion of petalite to beta-spodumene upon firing. Examples of alkaline earth metal compounds which satisfy these conditions and hence are suitable for the present purpose are oxides, carbonates, nitrates, sulphates, and silicates of magnesium, calcium, strontium and barium, and minerals composed of these compounds such as talc, dolomite, limestone, periclase, witherite, wollastonite, aragonite, and brucite.

Figure 6:
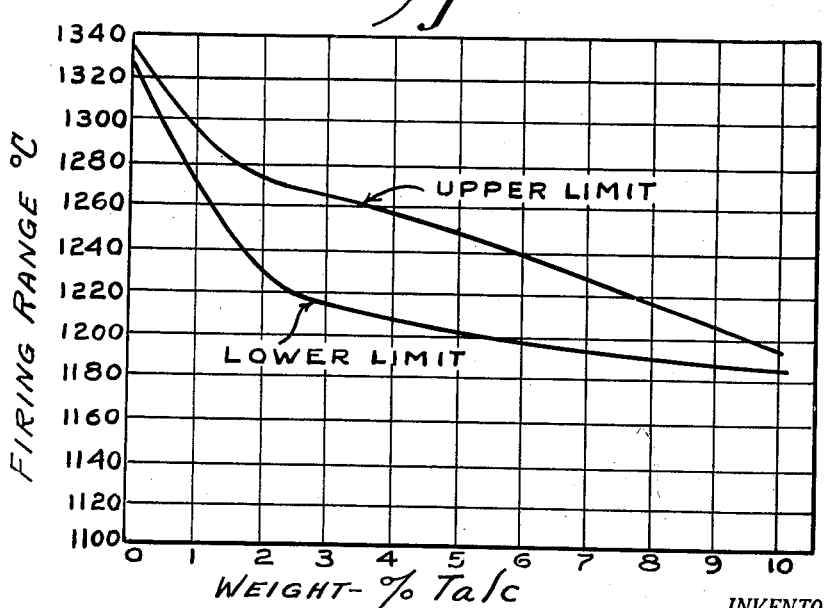

Figure 1 is a graph illustrating a particle-size distribution determination of a petalite and alkaline earth metal compound mixture which is suitable for the present purpose. Figures 2–5 are graphs which illustrate firing temperatures and improved firing ranges of ceramic articles containing petalite and 1–10 weight percent of MgO, CaO, SrO, and BaO respectively as calculated from the batches and Figure 6 illustrates the same properties for articles made from a refractory batch containing petalite and 1–20 weight percent of talc.

More specifically, the objects of the present invention are obtained by preparing a refractory ceramic batch by mixing petalite with one or more alkaline earth metal compounds in proportions of 90-99 weight percent and 1-10 weight percent on the oxide basis respectively. Commercial petalite has a composition by weight percent which varies within the following range:

| | |
|---|---|
| $SiO_2$ | 76.2–77.8 |
| $Al_2O_3$ | 16.8–17.2 |
| $Li_2O$ | 4.3–4.6 |
| $MgO$ | 0–0.2 |
| $CaO$ | 0–0.2 |
| $Fe_2O_3$ | 0.05–0.2 |
| $K_2O$ | 0.1–0.4 |
| $Na_2O$ | 0.1–0.3 |

Table I sets forth examples of several batch compositions, in parts by weight, which have proved effective for the objects of this invention. Example 1 is a batch of 100% petalite and is included for comparison.

Table I

| Example | 1 | 2 | 3 | 4 | 5 | 6 | 7 | 8 | 9 |
|---|---|---|---|---|---|---|---|---|---|
| Petalite | 100 | 99 | 98 | 97 | 95 | 90 | 99 | 98 | 97 |
| CaO | | | | | | | 1 | 2 | 3 |
| BaO | | 1 | 2 | 3 | 5 | 10 | | | |

| Example | 10 | 11 | 12 | 13 | 14 | 15 | 16 | 17 | 18 |
|---|---|---|---|---|---|---|---|---|---|
| Petalite | 95 | 90 | 99 | 98 | 97 | 95 | 90 | 99 | 93 |
| MgO | | | 1 | 2 | 3 | 5 | 10 | | |
| CaO | 5 | 10 | | | | | | | |
| SrCO₃ | | | | | | | | 1.6 | 3.2 |

| Example | 19 | 20 | 21 | 22 | 23 | 24 | 25 | 26 | 27 |
|---|---|---|---|---|---|---|---|---|---|
| Petalite | 97 | 95 | 90 | 98 | 98 | 97 | 95 | 90 | 80 |
| MgO | | | | 1 | 1 | | | | |
| CaO | | | | 1 | | | | | |
| SrCO₃ | 4.9 | 8.1 | 16.2 | | | | | | |
| BaO | | | | | 1 | | | | |
| Talc | | | | | | 3 | 5 | 10 | 20 |

Table II sets forth the compositions of the fired bodies computed from the batches to the oxide basis in weight percent, the MgO and CaO present in the petalite as impurities appearing as 0.2 weight percent each in the fired bodies.

Table II

| Example | 1 | 2 | 3 | 4 | 5 | 6 | 7 | 8 | 9 |
|---|---|---|---|---|---|---|---|---|---|
| $Li_2O$ | 4.5 | 4.5 | 4.4 | 4.4 | 4.3 | 4.0 | 4.5 | 4.4 | 4.4 |
| $Al_2O_3$ | 17.4 | 17.2 | 17.0 | 16.9 | 16.5 | 15.7 | 17.2 | 17.0 | 16.9 |
| $SiO_2$ | 76.8 | 76.0 | 75.3 | 74.4 | 72.9 | 69.1 | 76.0 | 75.3 | 74.4 |
| MgO | 0.2 | 0.2 | 0.2 | 0.2 | 0.2 | 0.2 | 0.2 | 0.2 | 0.2 |
| CaO | 0.2 | 0.2 | 0.2 | 0.2 | 0.2 | 0.2 | 1.2 | 2.2 | 3.2 |
| BaO | | 1.0 | 2.0 | 3.0 | 5.0 | 10.0 | | | |
| Impurities | 0.9 | 0.9 | 0.9 | 0.9 | 0.9 | 0.8 | 0.9 | 0.9 | 0.9 |

| Example | 10 | 11 | 12 | 13 | 14 | 15 | 16 | 17 | 18 |
|---|---|---|---|---|---|---|---|---|---|
| $Li_2O$ | 4.3 | 4.0 | 4.5 | 4.4 | 4.4 | 4.3 | 4.0 | 4.5 | 4.4 |
| $Al_2O_3$ | 16.5 | 15.7 | 17.2 | 17.0 | 16.9 | 16.5 | 15.7 | 17.2 | 17.0 |
| $SiO_2$ | 72.9 | 69.1 | 76.0 | 75.3 | 74.4 | 72.9 | 69.1 | 76.0 | 75.3 |
| MgO | 0.2 | 0.2 | 1.2 | 2.2 | 3.2 | 5.2 | 10.2 | 0.2 | 0.2 |
| CaO | 5.2 | 10.2 | 0.2 | 0.2 | 0.2 | 0.2 | 0.2 | 0.2 | 0.2 |
| SrO | | | | | | | | 1.0 | 2.0 |
| Impurities | 0.9 | 0.8 | 0.9 | 0.9 | 0.9 | 0.9 | 0.8 | 0.9 | 0.9 |

| Example | 19 | 20 | 21 | 22 | 23 | 24 | 25 | 26 | 27 |
|---|---|---|---|---|---|---|---|---|---|
| $Li_2O$ | 4.3 | 4.3 | 4.0 | 4.4 | 4.4 | 4.4 | 4.3 | 4.0 | 3.6 |
| $Al_2O_3$ | 16.9 | 16.5 | 15.7 | 17.0 | 17.0 | 16.9 | 16.5 | 15.7 | 13.9 |
| $SiO_2$ | 74.4 | 72.9 | 69.1 | 75.3 | 75.3 | 76.4 | 76.2 | 75.8 | 74.7 |
| MgO | 0.2 | 0.2 | 0.2 | 1.2 | 1.2 | 1.2 | 1.9 | 3.5 | 6.9 |
| CaO | 0.2 | 0.2 | 0.2 | 1.2 | 0.2 | 0.2 | 0.2 | 0.2 | 0.2 |
| SrO | 3.0 | 5.0 | 10.0 | | | | | | |
| BaO | | | | | 1.0 | | | | |
| Impurities | 0.9 | 0.9 | 0.8 | 0.9 | 0.9 | 0.9 | 0.9 | 0.8 | 0.7 |

The properties of these fired specimens are set forth in Table III.

Table III

| Example | 1 | 2 | 3 | 4 | 5 | 6 | 7 |
|---|---|---|---|---|---|---|---|
| Exp. Coeff. x 10⁷/° C | −1.5 | −1.8 | −1.2 | 0.9 | 5.7 | 14.2 | −1.0 |
| Firing Temp.: | | | | | | | |
| Min. (° C.) | 1,330 | 1,310 | 1,280 | 1,250 | 1,200 | 1,100 | 1,300 |
| Max. (° C.) | 1,335 | 1,330 | 1,310 | 1,290 | 1,250 | 1,180 | 1,320 |
| Modulus of Rupture (p.s.i. x 10⁻³) | 5.4 | 9.8 | 7.3 | 8.4 | 7.7 | 8.4 | 10.2 |

| Example | 8 | 9 | 10 | 11 | 12 | 13 | 14 |
|---|---|---|---|---|---|---|---|
| Exp. Coeff. x 10⁷/° C | 0.4 | 3.3 | 7.4 | 14.0 | 1.2 | 2.5 | 2.3 |
| Firing Temp.: | | | | | | | |
| Min. (° C.) | 1,250 | 1,200 | 1,150 | 1,130 | 1,310 | 1,270 | 1,280 |
| Max. (° C.) | 1,280 | 1,250 | 1,200 | 1,150 | 1,330 | 1,300 | 1,290 |
| Modulus of Rupture (p.s.i. x 10⁻³) | 9.1 | 9.0 | 7.0 | 7.0 | 8.9 | 6.8 | 7.2 |

| Example | 15 | 16 | 17 | 18 | 19 | 20 | 21 |
|---|---|---|---|---|---|---|---|
| Exp. Coeff. x 10⁷/° C | 3.9 | 14.5 | −2.0 | −0.8 | 1.0 | 6.4 | 13.8 |
| Firing Temp.: | | | | | | | |
| Min. (° C.) | 1,250 | 1,240 | 1,300 | 1,280 | 1,230 | 1,160 | 1,120 |
| Max. (° C.) | 1,270 | 1,250 | 1,330 | 1,310 | 1,270 | 1,210 | 1,160 |
| Modulus of Rupture (p.s.i. x 10⁻³) | 7.0 | 7.0 | 7.4 | 8.1 | 7.1 | 7.4 | 6.8 |

| Example | 22 | 23 | 24 | 25 | 26 | 27 |
|---|---|---|---|---|---|---|
| Exp. Coeff. x 10⁷/° C | −2.9 | −0.1 | −0.1 | −1.6 | 3.2 | 9.5 |
| Firing Temp.: | | | | | | |
| Min. (° C.) | 1,285 | 1,250 | 1,250 | 1,220 | 1,200 | 1,185 |
| Max. (° C.) | 1,320 | 1,290 | 1,285 | 1,270 | 1,250 | 1,195 |
| Modulus of Rupture (p.s.i. x 10⁻³) | 8.5 | 8.5 | 8.0 | 10.0 | 9.6 | 8.3 |

The modulus of rupture of each test specimen was determined by single-point loading of the test bar at the center of a three-inch span.

The expansion coefficients of the above compositions measured between 0° and 300° C. are constant throughout the range, that is, their elongations change linearly with temperature. Such constancy apparently holds for temperatures up to 900° C. as was shown by quenching specimens of each from 900° C. into ice water without their cracking or spalling and, in one instance (Example 25), by measuring the expansion coefficient between 0° and 1000° C.

Table III illustrates the improvement in desirable properties resulting from the addition of minor amounts of alkaline earth metal compounds to petalite. Thus not only is the firing range increased from 5° C. for bodies of 100% petalite to 10–80° C. for bodies containing 1–10 weight percent of alkaline earth metal compounds computed as the oxide, but the strength of the bodies is also surprisingly increased by about 40 to 100%. Additionally, this invention provides a means for making ceramic articles with any desired expansion coefficient from a small negative value up to about $15 \times 10^{-7}$ per ° C.

The low expansion coefficient and high modulus of rupture give remarkable thermal shock resistance to bodies made according to this invention. For example, a hollow cylinder 12 inches high, 17 inches in outside diameter with a 2-inch-thick wall made from a batch consisting of 95 weight percent petalite and 5 weight percent talc, has been quenched from 700° C. into ice water with no adverse effects.

The thermal stability of bodies made according to the present invention is also excellent. For example, an article made from a batch consisting of 95 weight percent of petalite and 5 weight percent of talc, with an expansion coefficient of $-1.6 \times 10^{-7}$ per ° C., was heated at 1000° C. for 240 hours and its change in expansion coefficient was negligible.

Table III and Figures 2 to 6 illustrate that while the firing temperature changes inversely, and the expansion coefficient generally increases directly with the alkaline earth metal oxide content, the absolute value of these properties depends upon the specific oxide or oxides used. This phenomenon results in an effective means for glazing bodies with low expansion coefficients. The well-known requirements for a glaze are that the glaze have a firing temperature less, preferably at least 30° C. less, than the maximum firing temperature of the bisque, and that it have an expansion coefficient compatible with the bisque, preferably the same or slightly less. The large number of combinations of firing temperature and expansion coefficient for petalite and alkaline earth metal oxide mixtures, therefore, make these compositions suitable for use as glazes. For example, a porous ceramic article made by firing a body consisting of 100% petalite batch at a temperature of less than 1330° C. can be advantageously and preferably provided with an impervious surface layer by coating the article with a slip containing petalite and barium oxide in a weight ratio of 98:2 and firing at 1290° C. for 5 minutes.

Any of the standard methods for making ceramic bodies can be used to manufacture articles which incorporate the advantages of the present invention.

The petalite batch containing the alkaline earth metal compound can be desirably finely divided and uniformly mixed in a ball mill. Preferably, the batch should be ball-milled until only about 10 weight percent is retained on a 325 mesh screen. The graph in Figure 1 illustrates the most suitable particle-size distribution for the purposes of this invention.

The finely divided batch material may be shaped by any of the known ceramic forming methods, but slip-casting has been found to be particularly suitable. A satisfactory means for slip casting is to mix 79 parts by weight of the batch with 21 parts by weight of deionized water, 0.04 part by weight of sodium carbonate, and 0.02 part by weight of sodium silicate in a ball mill until the slip has a viscosity of between 40 and 50 seconds as measured in a Zahn viscosimeter. The slip is allowed to cool to room temperature and slip-cast to the desired shape in the usual manner. The mold is removed and the green casting is allowed to dry for 24 hours at room temperature. The casting is then dried in an oven at 130° F. until it attains constant weight for 24 hours. One article cast in this way was the hollow cylinder described above.

The article is then fired to a temperature of less than 1325° C. to consolidate the article to zero porosity. The firing also converts the petalite, which is a stable crystalline phase only at temperatures of less than about 700° C., irreversibly to a solid solution of silica and beta-spodumene; the presence of crystalline beta-spodumene being discernible by X-ray examination. Although the firing schedule can be varied considerably one which is satisfactory and preferable for articles with wall thickness up to 3 inches is as follows:

Table IV

| Temp. Range | Firing Rate |
| --- | --- |
| Room temp. to 300° C. | 35° C./hr. |
| 300° C. to 600° C. | 50° C./hr. |
| 600° C. to (mean firing temp. −75° C.) | 100° C./hr. |
| (Mean firing temp. −75° C.) to max. firing temp. | 25° C./hr. |
| Hold at max. firing temp. | 30 minutes. |

The minimum firing temperature as used in the above table is the temperature at which the refractory material will coalesce to a non-porous condition as determined by measuring the dry weight of such a body and its weight after being immersed in boiling water for one hour, cooled to room temperature in cold water, and dried with a cloth. A "non-porous" body will not increase in weight after such a treatment. Coalescence of the refractory to such a non-porous condition is considered to result from a surface-tension-type of mechanism although no liquid phase exists and hence the temperature at which this phenomenon commences is also called the sintering point.

The maximum firing temperature, or sagging temperature, refers to the temperature at which a liquid phase appears and hence, the temperature at which a body commences to deform by its own weight. The mean temperature, of course, is the average of maximum and minimum firing temperatures.

Articles with wall thicknesses substantially greater than 3 inches obviously have to be fired at slower rates than those given in the above firing schedule while articles with wall thicknesses less than about ½ inch can be fired at more rapid rates.

Cooling of the fired article can be accomplished at any desired rate. It has been found preferable to cool the fired article by turning off the furnace and allowing the article and the furnace to cool together to room temperature. Cooling in this manner is accomplished in about 3 hours. However, cooling can be achieved in substantially less time and without objectionable results by merely removing the fired article from the furnace at the completion of the dwell.

A firing range of 30° C. is ample for conventionally firing most articles, but greater firing ranges are not detrimental in any way, and may even be advantageous for firing extremely thick-walled objects. Likewise, while compositions with firing ranges less than 30° C. are impractical for firing effectively on a commercial scale, compositions with firing ranges of 10 to 30° C. exhibit some of the advantages of the present invention and can be fired in a precisely controlled furnace which has little temperature variation within or they can be used as glazes.

Figures 2–6 set forth the maximum and minimum firing temperatures for petalite containing some alkaline earth metal compounds in amounts which are effective for the purposes of this invention. The firing temperatures for other suitable compositions can be determined in the same manner as was done for the above examples, namely, by mixing 100 parts by weight of the finely divided batch with 15 parts by weight of water and 8 parts by weight of polyethylene glycol wax with an average molecular weight of 6000, one commercially available product being sold under the trademark "Carbowax 6000" by the Union Carbide Chemical Corporation. The resultant mixture is then granulated, pressed into bars of about 4" x ¾" x ⅜" under pressure of about 5000 p.s.i., placed in a furnace on supports 3½" apart, heated to 1100° C. according to the firing schedule set forth in Table IV and then heated beyond 1100° C. at a rate of about 25° C. per hour until the maximum firing temperature is evidenced by sagging of the bars. The firing range can be subsequently determined by heating a group of such bars according to the same schedule, withdrawing one bar at about 100° C. below the previously determined maximum firing temperature and continuing to withdraw a bar at suitable temperature intervals thereafter, e.g. 5° C., and testing each for water absorption, until the lower limit of the firing range is evidenced by zero water absorption.

The advantages of this invention are obtained when the ceramic batch contains a total of 1 to 10 percent by weight of the alkaline earth metal compounds, computed as the oxides, and obviously each composition may be particularly suitable for a specific purpose. However, compositions containing about 2 to 5.5 percent by weight are particularly effective as they have a sufficiently large firing range for conventionally firing articles of all types, and each produces a ceramic with a high modulus of rupture and a very low expansion coefficient.

The preferred embodiment of this invention is a ceramic article made by slip casting in the described manner the batch set forth in Example 25, firing the article according to the firing schedule of Table IV to a temperature of 1265° C., and cooling to room temperature at the furnace rate. This embodiment is particularly useful because articles thereby formed have a high thermal shock resistance resulting from a low expansion coefficient of $-1.6 \times 10^{-7}$ per ° C. and a modulus of rupture of 10,000 p.s.i., and they can be readily fired to a non-porous state in conventional manner because such composition has a firing range of 30° C. or greater, namely 50° C.

What is claimed is:

1. A method of making a low-expansion, non-porous ceramic article which comprises intimately mixing finely divided petalite with at least one alkaline earth metal compound selected from the group consisting of the oxide, the silicate, and a compound which decomposes into the oxide or silicate at a temperature of less than about 1100° C., said compound being present in an amount equivalent to 1–10 weight percent computed as the oxide, forming the mixture into the desired shape, and firing the shaped article at a temperature between 1100–1330° C. for a time sufficient to sinter it to a non-porous body.

2. A method of making a low-expansion, non-porous ceramic article according to claim 1 wherein the thermal decomposition product is the oxide thereof.

3. A method of making a low-expansion, non-porous ceramic article according to claim 1 wherein the thermal decomposition product is the silicate thereof.

4. A method of making a low-expansion, non-porous ceramic article according to claim 1 wherein the compound of the alkaline earth metal is present in an amount equivalent to 2 to 5.5 weight percent computed as the oxide.

5. A ceramic body comprising a sintered, non-porous composition consisting essentially by weight on the oxide basis of 69–76% $SiO_2$, 15–17% $Al_2O_3$, 4–4.5% $Li_2O$, and 1–10% alkaline earth metal oxide and showing by X-ray analysis the presence of crystalline beta-spodumene, whereby the body has a thermal expansion coefficient of between $-2 \times 10^{-7}$ per ° C. and $15 \times 10^{-7}$ per ° C. when measured between 0° C. and 300° C.

References Cited in the file of this patent
UNITED STATES PATENTS

| | | |
|---|---|---|
| 2,019,542 | McKinley et al. | Nov. 5, 1935 |
| 2,785,080 | Hummel | Mar. 12, 1957 |